United States Patent
Brdiczka et al.

(10) Patent No.: US 8,688,690 B2
(45) Date of Patent: Apr. 1, 2014

(54) METHOD FOR CALCULATING SEMANTIC SIMILARITIES BETWEEN MESSAGES AND CONVERSATIONS BASED ON ENHANCED ENTITY EXTRACTION

(75) Inventors: Oliver Brdiczka, Mountain View, CA (US); Petro Hizalev, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 645 days.

(21) Appl. No.: 12/760,900

(22) Filed: Apr. 15, 2010

(65) Prior Publication Data
US 2011/0258181 A1    Oct. 20, 2011

(51) Int. Cl.
*G06F 17/30*    (2006.01)

(52) U.S. Cl.
USPC .......................................... 707/723; 707/736

(58) Field of Classification Search
USPC .................................. 707/723, 736
See application file for complete search history.

(56) References Cited

U.S. PATENT DOCUMENTS

| | | | | |
|---|---|---|---|---|
| 5,991,755 | A | * | 11/1999 | Noguchi et al. ...................... 1/1 |
| 6,816,175 | B1 | * | 11/2004 | Hamp et al. .................. 715/854 |
| 2003/0033288 | A1 | * | 2/2003 | Shanahan et al. ................. 707/3 |
| 2007/0156732 | A1 | | 7/2007 | Surendran |
| 2009/0070325 | A1 | * | 3/2009 | Gabriel et al. ..................... 707/5 |
| 2009/0106375 | A1 | | 4/2009 | Carmel |
| 2009/0182553 | A1 | * | 7/2009 | Chaney et al. ..................... 704/9 |
| 2011/0060796 | A1 | * | 3/2011 | Grigsby et al. ............... 709/206 |

FOREIGN PATENT DOCUMENTS

WO    2009052277 A1    4/2009

OTHER PUBLICATIONS

Stefan Evert: "The Statistics of Word Cooccurrences Word Pairs and Collocations", Jan. 1, 2005, XP55002453, pp. 15-21, 23, 24-27.
Salton G. et al., "Term-Weighting Approaches in Automatic Text Retrieval", Information Processing & Management, Elsevier, Barking, GB, vol. 24, No. 5, Jan. 1, 1988, pp. 513-523.
Elie Sanchez: "Fuzzy Logic and the Semantic Web", Jan. 1, 2006, pp. 285-288.
Gerard Salton, et al., "Introduction to Modern Information Retrieval", 1983, McGraw-Hill Book Company, New York, NY, pp. 201-215.
David Nadeau et al., "A Survey of Named Entity Recognition and Classification", Internet Citation, 2007, pp. 1-20.
Tru H Cao et al., "Fuzzy Named Entity-Based Document Clustering", Fuzzy Systems, 2008, pp. 2028-2034.
Manco G et al., "A framework for adaptive mail classification", Proceedings of the 14th IEEE international Conference on Tools with Artificial Intelligence, Nov. 4, 2002, pp. 387-392.

* cited by examiner

*Primary Examiner* — Apu Mofiz
*Assistant Examiner* — Fariborz Khoshnoodi
(74) *Attorney, Agent, or Firm* — Shun Yao; Park, Vaughan, Fleming & Dowler LLP

(57) ABSTRACT

One embodiment of the present invention provides a system for estimating a similarity level between documents. During operation, the system receives a number of documents, extracts a number of semantic entities from the documents, calculates the similarity level between the documents based on the extracted semantic entities, and produces a result indicating similar documents based on the calculated similarity level.

23 Claims, 5 Drawing Sheets

METHOD FOR CALCULATING SEMANTIC SIMILARITIES BETWEEN MESSAGES AND CONVERSATIONS BASED ON ENHANCED ENTITY EXTRACTION

RELATED APPLICATION

The subject matter of this application is related to the subject matter in a co-pending non-provisional application by the same inventors as the instant application and filed on the same day as the instant application entitled "METHOD FOR CALCULATING ENTITY SIMILARITIES," having Ser. No. 12/760,949, and filed on 15 Apr. 2010.

BACKGROUND

1. Field

This disclosure is generally related to analysis of messages and conversations. More specifically, this disclosure is related to calculating semantic similarities between messages and conversations.

2. Related Art

The proliferation of electronic mails (emails) has greatly impacted people's everyday life, especially their working life. Modern workers spend, on average, one to two hours of their workday on emails: reading, ordering, sorting, and writing. It is very common for an email user to receive tens, even hundreds, of emails every day. Many of the emails carry important information that may need to be retrieved at a later time. However, the cluttered email inbox of a user often makes retrieving such information difficult.

To help email users better organize their email messages, various email applications have provided different solutions. For example, users of Outlook® (registered trademark of Microsoft Corporation of Redmond, Wash.) can apply various rules to incoming emails in order to sort them into different folders. In addition, Outlook® can aggregate email messages into conversations by matching subject lines or senders/recipients. Note that an email conversation is a set of related messages generated by the "reply" operation. Gmail™ (trademark of Google Inc. of Mountain View, Calif.) allows its users to apply labels to messages in order to categorize the messages accordingly. Hence, a user can place all emails related to a task within a single folder, or apply a single label to these emails. As a result, if the user ever needs to retrieve information related to a task, he can go to the corresponding folder or click on the corresponding label. However, these approaches require manual input from the user, which can be cumbersome and time-consuming. In addition, in scenarios where no explicit rule or label can be applied to a message, or where the sender of a message does not use the reply function, the user may find it difficult to retrieve related messages.

SUMMARY

One embodiment of the present invention provides a system for estimating a similarity level between documents. During operation, the system receives a number of documents, extracts a number of semantic entities from the documents, calculates the similarity level between the documents based on the extracted semantic entities, and produces a result indicating similar documents based on the calculated similarity level.

In a variation on this embodiment, extracting a semantic entity involves: applying a number of finite state machines configured to recognize a word and/or a sequence of words that belong to at least one of a number of predefined groups; searching and comparing at least one external resource to determine whether the recognized word and/or sequence of words match an entry within the external resource; and, in response to a match being found, extracting the word and/or sequence of words as a semantic entity.

In a further variation, extracting the semantic entity involves: calculating an inverse document frequency (IDF) value of the semantic entity; determining whether the IDF value is within a range of predetermined values; and, in response to the IDF value being within this range, extracting the semantic entity.

In a further variation, the predefined groups comprise at least one of: people's names, companies' names, industry-specific terms, dates and times, street addresses, email addresses, uniform resource locators (URLs), and telephone numbers.

In a variation on this embodiment, calculating the similarity level involves calculating a number of similarity measures based on weighted IDF values of extracted semantic entities.

In a further variation, the system assigns a weight of an extracted semantic entity's IDF value based on a predefined group to which the extracted semantic entity belongs.

In a further variation, the similarity measures include at least one of: a similarity measure based on a ratio of a summation of weighted IDF values of semantic entities included in an intersection of the documents to a summation of weighted IDF values included in individual documents; a similarity measure based on a ratio of a summation of weighted IDF values of semantic entities included in an intersection of the documents to a summation of weighted IDF values included in a union of the documents; and a cosine similarity measure.

In a variation on this embodiment, the system further selects a document, calculates similarity levels of other documents in relation to the selected document, and displays the other documents in an order based on the calculated similarities of the other documents in relation to the selected document.

In a variation on this embodiment, the documents include an email message and/or an email conversation.

In a further variation, calculating the similarity level further involves calculating similarities based on senders and/or recipients of the email message.

In a further variation, calculating the similarity level further involves calculating similarities based on sending and/or receiving times of the email message.

In a variation on this embodiment, calculating the similarity level involves determining weights of the documents

BRIEF DESCRIPTION OF THE FIGURES

In the figures, like reference numerals refer to the same figure elements.

DETAILED DESCRIPTION

Figure 1:
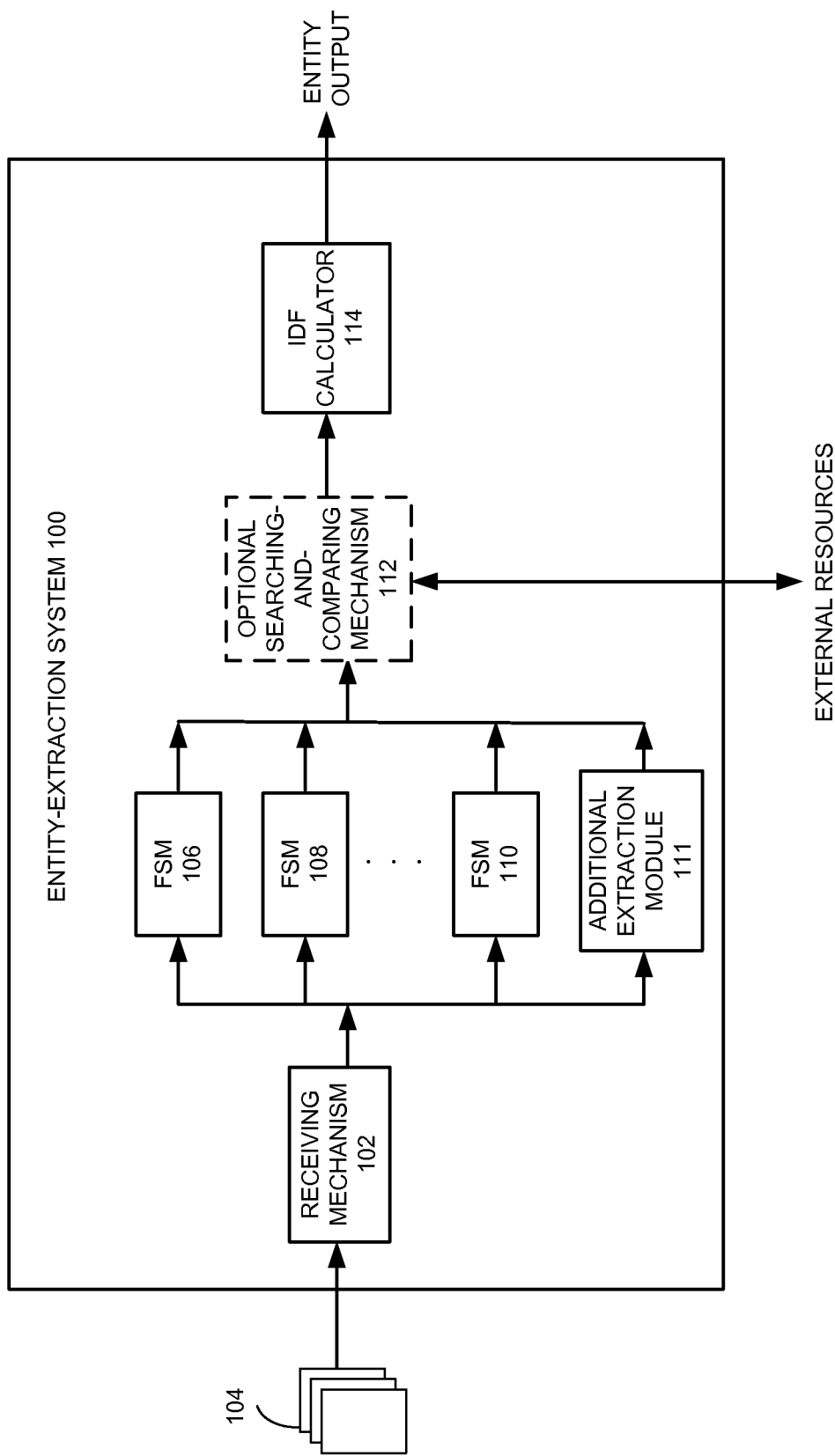
FIG. 1 presents a diagram illustrating an entity-extraction system in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for identifying similarities between documents. During operation, the system extracts semantic entities from a collection of documents, and determines whether an extracted semantic entity is a significant entity based on its inverse document frequency (IDF) value. The system calculates similarities between documents using various criteria based on the occurrence and co-occurrence of the entities and their weight. Other criteria, including similarities based on sender and recipient, are also used to determine a final similarity between documents.

Extracting Semantic Entities

In order to help email users organize their saved email messages efficiently, or present messages to users in a way that has a better local context, various solutions have been implemented, including grouping emails based on conversations to which they belong. An email conversation is established when email users correspond back-and-forth to each other, similarly to having a real-life conversation. Most often, when users are discussing a related topic, they reply to each other's emails, as if they were having a real-life conversation. However, conversation-based grouping can be insufficient, especially in cases where several different conversations are taking place regarding a related matter. For example, a task organizer may have different task-related conversations with different task members. These conversations, or emails within the conversations, often share a similar topic or are related to the same task, and it is desirable to group them together for display.

Because these conversations and messages are related, they often share similar words or combinations of words. For example, conversations discussing local weather may all include words like rain, snow, or wind. Hence, by comparing the text, one can estimate the similarity between two messages.

Conventional similarity calculations between documents typically rely on matching the text of the concerned documents by counting and comparing occurrences of words. However, such an approach can be inefficient and may generate false results. For example, for emails containing boilerplate text, the co-occurrence of the boilerplate may be high between two messages, whereas the similarity between the two messages may actually be low. To overcome such an issue, in one embodiment of the present invention, instead of counting the occurrences of each word, the system relies on the comparison of the occurrences of meaningful words that are defined as "entities" in order to derive similarities between messages or conversations.

FIG. 1 presents a diagram illustrating an entity-extraction system in accordance with an embodiment of the present invention. Entity-extraction system 100 includes a receiving mechanism 102, a number of finite state machines (FSMs) 106-110, an optional searching-and-comparing mechanism 112, and an IDF calculator 114.

During operation, receiving mechanism 102 receives input documents 104 for entity extraction. Input documents 104 can be any type of document that contains text, symbols, figures, and/or any combination thereof. Input documents 104 can also be of any types of file format, such as plain text, Microsoft® Word (registered trademark of Microsoft Corporation of Redmond, Wash.), Hyper Text Markup Language (HTML), Portable Document Format (PDF), etc. In one embodiment, input documents 104 include email messages. Input documents 104 can also include all documents contained in a corpus. For example, input documents 104 can include all messages in a user's email folders.

The text of the received documents is then sent to a number of FSMs, including FSMs 106-110. These FSMs have been designed differently to recognize semantic entities belonging to different predefined groups. Semantic entities can be words, word combinations, or sequences having specific meanings. A word or a sequence of words can be a semantic entity if it belongs to a specific word group, such as people's names, companies' names, dates and times, street addresses, industry-specific terms, email addresses, uniform resource locators (URLs), and phone numbers. FSMs 106-110 are able to recognize words of these specific groups in the text of the received documents while taking into account sentence and word structure. Standard annotation and parsing techniques can be used in order to recognize semantic entities. In one embodiment, FSMs 106-110 are configured to recognize semantic entities belonging to the aforementioned word groups. Furthermore, in cases in which a semantic entity does not belong to any of the specified groups or cannot be found in any dictionary, FSMs 106-110 can also be configured to recognize such a new entity based on its capitalization practices or other criteria that identify the new entity. In one embodiment, this additional semantic-entity-extraction function can be performed by an additional extraction module 111. If a word or a sequence of words in the received documents is consistently capitalized, either always or with a high percentage of all occurrences, it can be recognized as a semantic entity. For example, user-defined acronyms often do not belong to any specified group or cannot be found in any dictionary; however, they are meaningful semantic entities.

In addition to English, FSMs 106-110 can also be designed to recognize semantic entities in other languages. To achieve better extraction results, users can configure FSMs 106-110 based on types of received documents, including language type or content type. Note that in FIG. 1, FSMs 106-110 are implemented in a parallel fashion in which text is processed by these FSMs simultaneously; however, it is also possible to implement FSMs 106-110 serially. In addition to applying FSMs, other techniques, such as machine learning, are also possible for recognizing semantic entities in received documents.

To avoid meaningless words being incorrectly recognized by FSMs 106-110 as semantic entities, certain types of the identified entities from the text of the received documents are sent to optional searching-and-comparing mechanism 112 to be searched and compared with external resources. Note that because the searching-and-comparing operation does not apply to all entity types, this operation is optional. In one embodiment, the external resources include web resources, such as Wikimedia® (registered trademark of the Wikimedia Foundation Inc. of San Francisco, Calif.), and online dictionaries. In one embodiment, the external resources can also include an entity database. Standard web-searching or database-searching methods can be performed by optional searching-and-comparing mechanism 112. The output of optional searching-and-comparing mechanism 112 is a number of entity candidates to be considered for extraction.

Subsequently, the entity candidates are sent to IDF calculator 114, which calculates their IDF values. The IDF value of an entity candidate e is defined as:

$$idf_e = \log \frac{|T|}{|T_e|},$$

where |T| is the total number of documents (or email messages), and $|T_e|$ is the number of documents (or email messages) where the entity candidate e has been observed. The IDF value can be used to measure the significance of an entity candidate. A low IDF value often indicates that the entity candidate is broadly used across the corpus, thus being likely to be a boilerplate, a statistic outlier, or a wrong detection. In contrast, a highIDF value indicates that such an entity candidate is truly a meaningful or significant semantic entity and deserves to be extracted from the document. In one embodiment, entity candidates with IDF values within a predetermined range of values are extracted, whereas entity candidates with IDF values outside this range are ignored. In a further embodiment, the user is allowed to adjust the extraction range and corresponding thresholds based on his knowledge regarding the extracted entities.

Figure 2:
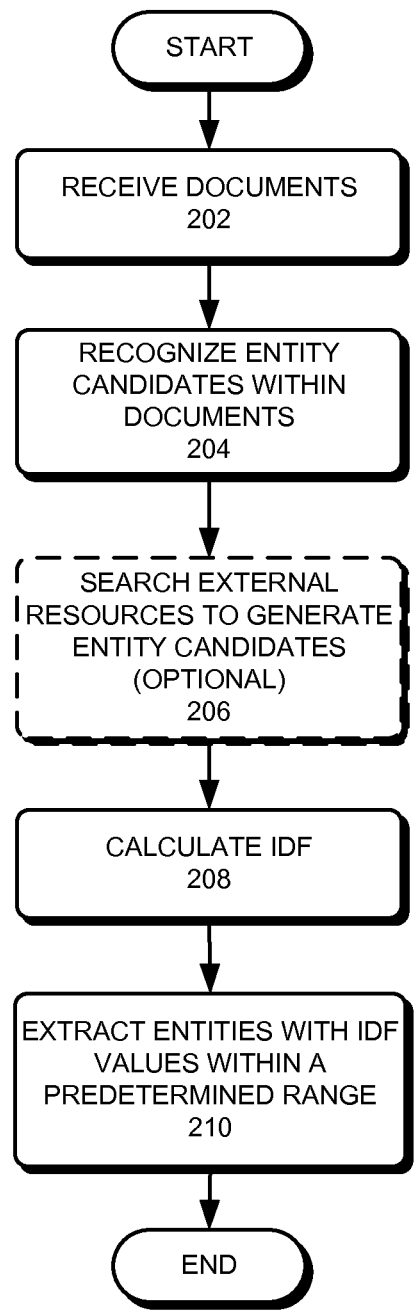
FIG. 2 presents a flowchart illustrating the process of extracting entities in accordance with an embodiment of the present invention.

FIG. 2 presents a flowchart illustrating the process of extracting entities in accordance with an embodiment of the present invention. During operation, the system receives all documents from a predefined corpus (operation 202). In one embodiment, the predefined corpus includes all documents from a user's email folders. The system then recognizes semantic entities within the documents (operation 204). In one embodiment, the system uses a number of FSMs for the detection of semantic entities. The system can then optionally search one or more external resources in order to compare detected semantic entities with known entities in the external resources (operation 206). The semantic entities with positive search results are considered entity candidates. Subsequently, the system calculates IDF values for entity candidates (operation 208). Entity candidates with IDF values within a predetermined range are extracted as meaningful semantic entities (operation 210).

Calculating Similarities

The extracted semantic entities, which are considered significant entities, can then be used for similarity calculations between messages. If two documents have a large number of overlapping significant entities, the system can determine that these two documents have a high likelihood of being similar, thus having a high similarity value. In addition to counting the occurrence of the significant entities within documents, embodiments of the present invention also take into account genetic entity weight when calculating document/message similarities. Entities belonging to different groups are assigned different weights. For example, entities belonging to the group of people's names are assigned a different weight from entities belonging to the group of street addresses. Depending on the importance of the different entity groups and the context of the corpus, the weights can be adjusted accordingly. For example, for a human-resources worker, people's names carry more weight than technical terms, whereas the opposite can be true for an engineer. In one embodiment, the entity weights are user-configurable.

A number of different measures can be calculated for determining similarity between messages. The first measure calculates the ratio of the overlapping entities between two messages to the summation of entities in each message. The first measure similarity between messages A and B can be calculated as:

$$sim_{first}(A, B) = \frac{2 * \sum_{e \in A \cap B} (idf_e * w_e)}{\sum_{e \in A} (idf_e * w_e) + \sum_{e \in B} (idf_e * w_e)}, \quad (1)$$

where $idf_e$ is the IDF value of the entity e, and $w_e$ is its weight. The numerator of the equation includes the weighted sum of the IDF values of the entities that appear in both documents, and the denominator includes the weighted summation of IDF values of entities in each separate document.

The second measure is similar to the first measure except that instead of summing weighted IDF values in each document separately, the denominator of the second measure sums the weighted IDF values of entities in the union of the two documents. The second measure similarity between messages A and B can be calculated as:

$$sim_{second}(A, B) = \frac{\sum_{e \in A \cap B} (idf_e * w_e)}{\sum_{e \in A \cup B} (idf_e * w_e)}. \quad (2)$$

The third measure of similarity is the standard cosine measure, in which the squares of weighted IDF values are summed. The third (or cosine) measure similarity can be calculated as:

$$sim_{third/cosine}(A, B) = \frac{\sum_{e \in A \cap B} (idf_e * w_e)^2}{\sqrt{\sum_{e \in A} (idf_e * w_e)^2 * \sum_{e \in B} (idf_e * w_e)^2}}. \quad (3)$$

In addition to the aforementioned three measures based on the occurrence of significant entities, the system also takes into account other information, such as senders and recipients of email messages and the times email messages are sent or received. In one embodiment, the similarities between senders and recipients of email messages are calculated using the aforementioned three measures in order to provide a finer-grained similarity value. Such a finer-grained similarity measurement can be useful when organizing emails based on similarity levels. For example, an email user may desire to organize his saved email messages based on similarity levels of other emails in relation to a given email message A. To do so, the system first calculates the entity-occurrence-based similarity levels to email A of all other emails, and then displays these emails in order based on the level of similarities. Often the email message with the highest similarity level to email A is displayed at the top as the most relevant one. However, if the entity-occurrence-based similarity levels of two emails B and C are close to each other (with a difference less than a predetermined threshold), the system needs to further calculate the sender-and-recipient-based similarity levels in relation to message A of messages B and C. If message B has a higher level of sender-and-recipient-based similarity to message A, the system can determine that, compared with message C, message B is more relevant to message A, and place message B at a higher position in the final similarity ordering list.

Similarly, the sending and receiving times of email messages can be used to provide even finer-grained similarity. In one embodiment, a newly generated message (i.e., the amount of time which has passed since the message has been sent or received is relatively small) has a higher time-based similarity level compared with other older messages. In the previous example, if the sender-and-recipient-based similarity levels to message A of messages B and C are also close to each other (smaller than a threshold), the system then calculates the time-based similarity. If message B is a more recently received message compared with message C, then the system can determine that, compared with message C, message B is more relevant to message A, and place message B at a higher position in the final similarity ordering list.

Figure 3:
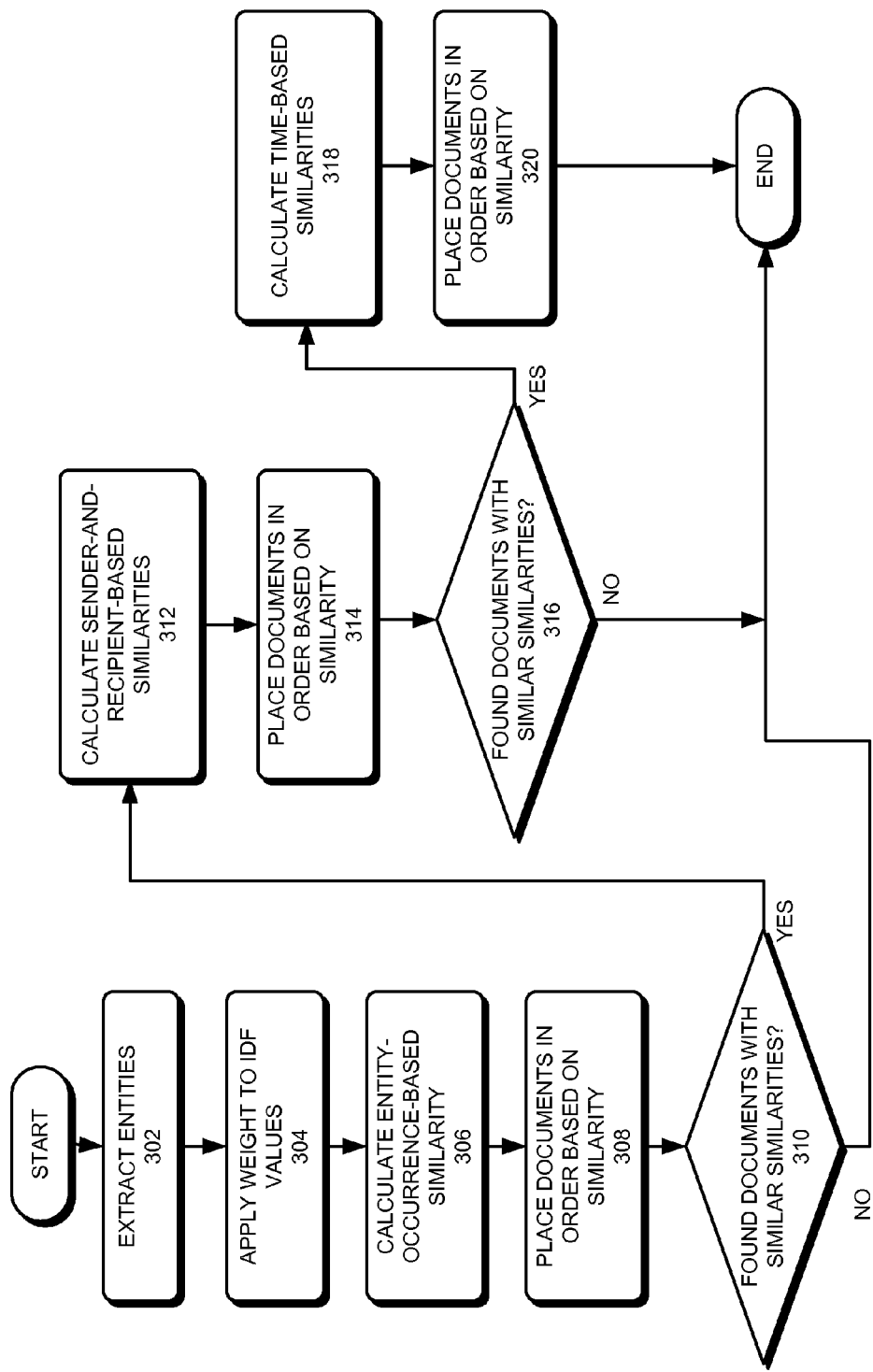
FIG. 3 presents a flowchart illustrating the process of placing documents in an order based on similarity levels toward a given document in accordance with an embodiment of the present invention.

FIG. 3 presents a flowchart illustrating the process of placing documents in an order based on similarity levels toward a given document in accordance with an embodiment of the present invention. During operation, the system extracts meaningful semantic entities from documents within a corpus, such as a user's emails (operation 302), and applies a weight to the IDF value of each entity based on the groups it belongs to (operation 304). In one embodiment, possible groups include, but are not limited to: people's names, companies' names, dates and times, street addresses, industry-specific terms, email addresses, uniform resource locators (URLs), and phone numbers. The entity-extraction process is similar to that shown in FIG. 2. For the given document, the system calculates the entity-occurrence-based similarity levels of a number of other documents within the corpus (operation 306). One or more of the three different measures of similarity levels can be calculated. The entity-occurrence-based similarity can be an aggregation of all three different measures. The user can also select a number of documents for similarity calculation. For example, the user can choose email messages from a particular folder, or the user can choose all emails.

Subsequently, the system places the documents in an order based on their entity-occurrence-based similarity toward the given document (operation 308). The system then determines whether two or more documents have similar levels of similarity (operation 310). In one embodiment, the system considers two documents to have similar levels of similarity if the difference between their entity-occurrence-based similarity levels is less than a predetermined threshold. If so, the system calculates sender-and-recipient-based similarities for documents with similar entity-occurrence-based similarities (operation 312), and places them in an order accordingly (operation 314). Subsequently, the system determines whether two or more documents have similar levels of sender-and-recipient-based similarity (operation 316). In one embodiment, the system considers two documents to have similar levels of similarity if the difference between their sender-and-recipient-based similarity levels is less than a predetermined threshold. If so, the system compares the sending or receiving times of the documents with similar sender-and-recipient-based similarities to generate time-based similarities for these documents (operation 318), and places them in an order based on the time-based similarities (operation 320). In one embodiment, the system compares the sending and receiving times in the order of milliseconds.

Figure 4:
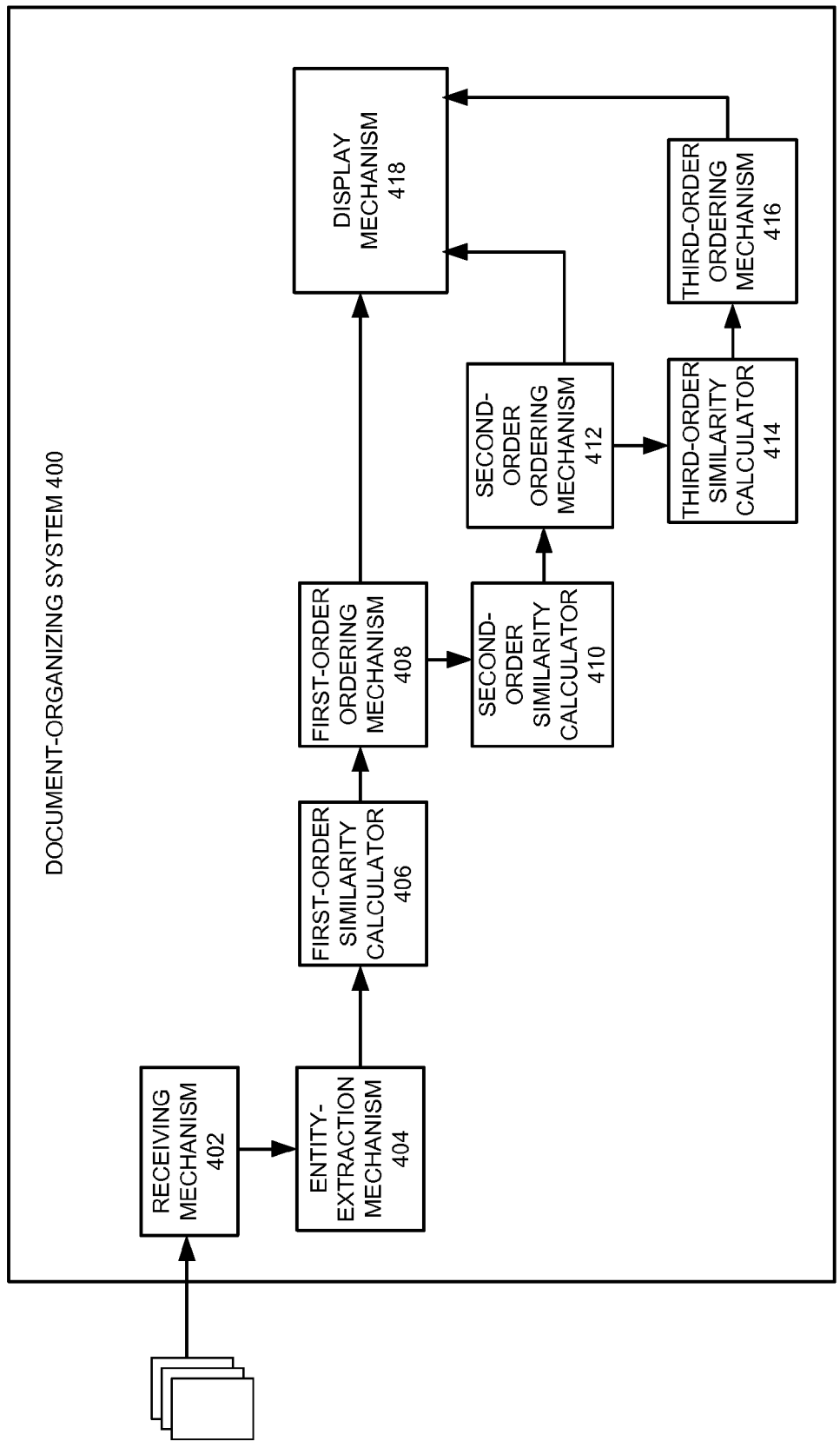
FIG. 4 presents a diagram illustrating the structure of a system for organizing documents based on similarities in accordance with an embodiment of the present invention.

FIG. 4 presents a diagram illustrating the structure of a system for organizing documents based on similarities in accordance with an embodiment of the present invention. Document-organizing System 400 includes a receiving mechanism 402, an entity-extraction mechanism 404, a first-order similarity calculator 406, a first-order similarity ordering mechanism 408, a second-order similarity calculator 410, a second-order similarity ordering mechanism 412, a third-order similarity calculator 414, a third-order similarity ordering mechanism 416, and a display mechanism 418.

During operation, receiving mechanism 402 receives a number of documents from a corpus, which can be the content of a user's email folders, and where documents are email messages. The received documents are sent to entity-extraction mechanism 404 for extraction of the meaningful semantic entities. Detailed structure of entity-extraction mechanism 404 is shown in FIG. 1. Note that the IDF values of the extracted entities have been calculated during the entity-extraction process. The documents and the extracted entities are then sent to first-order similarity calculator 406 for the calculation of the first-order similarity in relation to a given document. The given document can be selected by user, or the given document can be the document currently displayed in a window that is in focus. In one embodiment, the first-order similarity is based on the occurrence of the extracted entities within the given document and other documents. In a further embodiment, several different similarity measures are calculated, and the first-order similarity is based on the aggregation of the different measures. The other documents and their calculated first-order similarities in relation to the given document are then sent to first-order ordering mechanism 408, which is configured to place the other documents in an order based on the calculated first-order similarities in relation to the given document. Note that documents with first-order similarity levels smaller than a threshold are considered irrelevant to the given document, and are ignored.

If more than one document has a close similarity (i.e., the difference of the calculated first-order similarities between these documents is smaller than a threshold), then these documents are sent to second-order similarity calculator 410 for the calculation of the second-order similarity. In one embodiment, the second-order similarity is based on the sender-and-recipient information of the email messages. Similarly, a number of different similarity measures can be calculated to generate an aggregated second-order similarity. The output of second-order similarity calculator 410 is sent to second-order ordering mechanism 412, which is configured to place documents with similar first-order similarities in an order based on their second-order similarities.

If, after ordering documents based on their second-order similarities, there is still more than one document having similar similarities, the system can send these documents to third-order similarity calculator 414. Third-order similarity calculator 414 calculates third-order document similarities. In one embodiment, the third-order similarity is calculated based on the sending and receiving times of an email message. The output of third-order similarity calculator is then sent to third-order ordering mechanism 416, which is configured to further sort the documents based on the calculated third-order similarity. The sorting results of all three ordering mechanisms 408, 412, and 416 are sent to display mechanism 418, which is configured to display the documents in order of their relevancy in relation to the given document. In one embodiment, the document having the most relevance to the given document (having the highest similarity level) is placed at the top of the list.

Not all messages are considered to be equally important to the user. Hence, when calculating similarity between messages, one should take into account the level of importance of the messages. In other words, different email messages have different weights, and the similarity of one email toward the other depends on the message weight of the later.

A number of factors can influence the weight of a message. These factors include, but are not limited to: message type, information associated with senders an recipients, timing information, and entity density. Message type indicates whether the message is a request for information/action, a status upstate, a scheduling request, a reminder, or a social message. Different types of messages exhibit different importance to the user. For example, in a work environment, social messages are more likely to be less important than a message for scheduling a meeting. The importance of an email can also be reversely correlated with the number of recipients of the email. In other words, emails with vast recipients are less important.

Other information associated with senders and recipients of an email can also be used to gauge its importance to the user. For example, the system can determine how often emails are exchanged between the user and certain senders, and how balanced the exchange is. By doing so, the system can identify email senders of mailing lists, and use such information to adapt or reduce the importance of messages sent by such senders. In addition, the system can examine the "TO" field in an email message to determine whether the user is a direct recipient of the message. If so, the message can be given a higher weight. The system can also determine whether a message is a direct reply to one of the user's sent message. If so, the message is given a higher weight.

The age of an email also plays a role in determining its importance. In general, older emails (emails that are sent or received a long time ago) are less important to the user. Moreover, the number of extracted entities or the entity density within an email can also be used to measure its importance. Such entity density often corresponds to the information content and density of a message. Hence, a more informative message that includes a larger number of extracted entities can be viewed as more important to the user.

These different factors influencing message weight are mapped to values between 0.0 and 1.0, either using a rule-based approach (when information associated with senders and recipients are used for gauging importance) or a direct mapping function (when the number of receipts is used to calculate message weight). The final message weight is a weighted sum of the individual factor values. For a message j, the total weight of the message is given by:

$$w_{total,j} = \sum_j \alpha_i w_{i,j},$$

where $w_{i,j}$ represents the value of a factor i for message j, and $\alpha_i$ represents the weight of the factor i. Note that $$\sum_i \alpha_i = 1.$$

After taking into account of the message weight, the message similarity, for all three measures, can then be calculated as:

$$\text{sim}(A,B) = \text{sim}(A,B) \cdot w_{total,B} \quad (4).$$

In equation 4, the similarity is weighted based on the message weight of message B, thus indicating that the system seeks to get similarity values and rankings departing from message A. In other words, the system tries to find similar messages to message A, and these messages are weighted by their message weight.

In addition to email messages, in some embodiments of the present invention, the system can be further configured to calculate similarities between email conversations. In one embodiment, a group of email messages can be merged together into an email conversation by matching message subjects and recipients/senders. Hence, the aforementioned entity-extraction method and similarity-calculation method can be applied to the conversations formed by message clusters. Note that in equations 1 through 4 the notations A and B now refer to conversations A and B. In one embodiment, the IDF value of an entity can be calculated based on its occurrence within an entire conversation.

Exemplary Computer System

Figure 5:
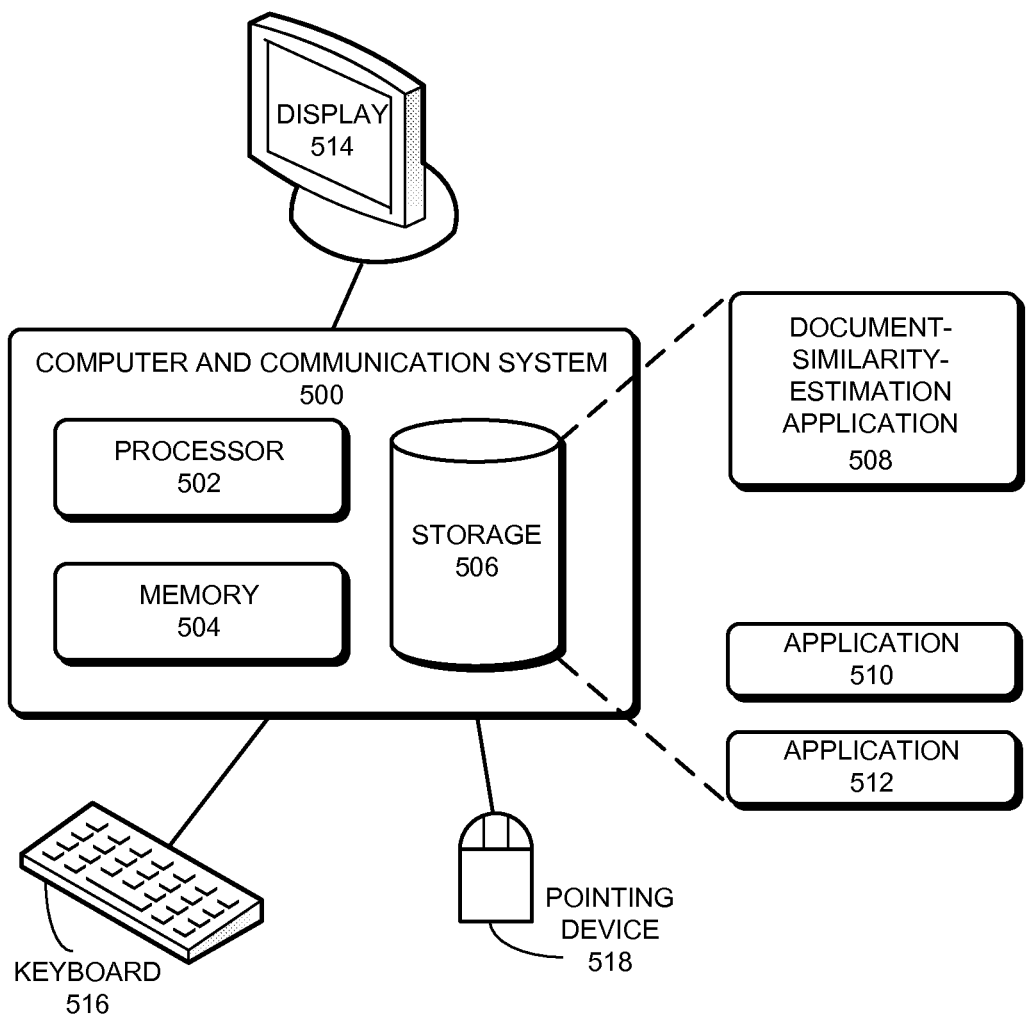
FIG. 5 illustrates an exemplary computer system for document-similarity estimation in accordance with one embodiment of the present invention.

FIG. 5 illustrates an exemplary computer system for document-similarity estimation in accordance with one embodiment of the present invention. In one embodiment, a computer and communication system 500 includes a processor 502, a memory 504, and a storage device 506. Storage device 506 stores a document-similarity-estimation application 508, as well as other applications, such as applications 510 and 512. During operation, document-similarity-estimation application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for estimating a similarity level between a set of documents, the method comprising:
    extracting, from a set of documents, a set of semantic entities, wherein a respective semantic entity includes a meaningful sequence of characters;
    determining, for the respective semantic entity, a predefined word group to which the respective semantic entity belongs, wherein the predefined word group indicates a content category associated with the respective semantic entity;
    computing an inverse document frequency (IDF) value for the respective semantic entity;
    assigning a weight to the computed IDF value based on the predefined word group to which the respective semantic entity belongs;
    calculating the similarity level sim(A,B) between a respective document A in the set of documents and a target document B, based on weighted IDF values associated with one or more of the extracted semantic entities, wherein calculating the similarity level involves calculating:

$$sim(A, B) = \frac{2 * \sum_{e \in A \cap B} (idf_e * w_e)}{\sum_{e \in A} (idf_e * w_e) + \sum_{e \in B} (idf_e * w_e)},$$

wherein $idf_e$ indicates an IDF value for an entity e, and wherein $w_e$ indicates a weight for entity e; and
    producing a result indicating documents that are similar to the target document based on the calculated similarity level.

2. The method of claim 1, wherein extracting the semantic entity further involves:
    applying a number of finite state machines configured to recognize the semantic entity as belonging to the predefined word group;
    searching and comparing at least one external resource to determine whether the recognized semantic entity matches an entry within the external resource; and
    in response to a match being found, extracting the semantic entity.

3. The method of claim 1, wherein extracting the semantic entity further involves:
    determining whether the IDF value associated with the semantic entity is within a predetermined range; and
    in response to the IDF value being within the predetermined range, extracting the semantic entity.

4. The method of claim 1, wherein the predefined word group includes at least one of:
    people's names;
    companies' names;
    industry-specific terms;
    dates and times;
    street addresses;
    email addresses;
    uniform resource locators (URLs); and
    telephone numbers.

5. The method of claim 1, further comprising:
    selecting a document;
    calculating similarity levels of other documents in relation to the selected document; and
    displaying the other documents in an order based on the calculated similarities of the other documents in relation to the selected document.

6. The method of claim 1, wherein the documents include an email message and/or an email conversation.

7. The method of claim 6, wherein calculating the similarity level involves calculating similarities based on senders and/or recipients of the email message.

8. The method of claim 6, wherein calculating the similarity level involves calculating similarities based on sending and/or receiving times of the email message.

9. The method of claim 1, wherein calculating the similarity level involves determining a weight function for a respective document.

10. A non-transitory computer-readable storage medium storing instructions that when executed by a computer cause the computer to perform a method for estimating a similarity level between documents, the method comprising:
    extracting, from a set of documents, a set of semantic entities, wherein a respective semantic entity includes a meaningful sequence of characters;
    determining, for the respective semantic entity, a predefined word group to which the respective semantic entity belongs, wherein the predefined word group indicates a content category associated with the respective semantic entity;
    computing an inverse document frequency (IDF) value for the respective semantic entity;
    assigning a weight to the computed IDF value based on the predefined word group to which the respective semantic entity belongs;
    calculating the similarity level sim(A,B) between a respective document A in the set of documents and a target document B, based on weighted IDF values associated with one or more of the extracted semantic entities, wherein calculating the similarity level involves calculating:

$$sim(A, B) = \frac{2 * \sum_{e \in A \cap B} (idf_e * w_e)}{\sum_{e \in A} (idf_e * w_e) + \sum_{e \in B} (idf_e * w_e)},$$

wherein $idf_e$ indicates an IDF value for an entity e, and wherein $w_e$ indicates a weight for entity e; and
    producing a result indicating documents that are similar to the target document based on the calculated similarity level.

11. The computer-readable storage medium of claim 10, wherein extracting the semantic entity further involves:
    applying a number of finite state machines configured to recognize the semantic entity as belonging to the predefined word group;
    searching and comparing at least one external resource to determine whether the recognized semantic entity matches an entry within the external resource; and
    in response to a match being found, extracting the semantic entity.

12. The computer-readable storage medium of claim 10, wherein extracting the semantic entity further involves:
    determining whether the IDF value associated with the semantic entity is within a predetermined range; and
    in response to the IDF value being within the predetermined range, extracting the semantic entity.

13. The computer-readable storage medium of claim 10, wherein the predefined word group includes at least one of:
    people's names;
    companies' names;

industry-specific terms;
dates and times;
street addresses;
email addresses;
uniform resource locators (URLs); and
telephone numbers.

14. The computer-readable storage medium of claim 10, wherein the method further comprises:
selecting a document;
calculating similarity levels of other documents in relation to the selected document; and
displaying the other documents in an order based on the calculated similarities of the other documents in relation to the selected document.

15. The computer-readable storage medium of claim 10, wherein the documents include an email message and/or an email conversation.

16. The computer-readable storage medium of claim 15, wherein calculating the similarity level involves calculating similarities based on senders and/or recipients of the email message.

17. The computer-readable storage medium of claim 15, wherein calculating the similarity level involves calculating similarities based on sending and/or receiving times of the email message.

18. The computer-readable storage medium of claim 10, wherein calculating the similarity level involves determining a weight function for a respective document.

19. A system for estimating a similarity level between documents, comprising:
an entity-extraction mechanism configured to extract, from a set of documents, a set of semantic entities, wherein a respective semantic entity includes a meaningful sequence of characters;
a determining mechanism configured to determine, for the respective semantic entity, a predefined word group to which the respective semantic entity belongs, wherein the predefined word group indicates a content category associated with the respective semantic entity;
an IDF-computing mechanism configured to compute an inverse document frequency (IDF) value for the respective semantic entity;
a weight-assigning mechanism configured to assign a weight to the calculated IDF value based on the predefined word group to which the respective semantic entity belongs;
a similarity-calculation mechanism configured to calculate the similarity level sim(A,B) between a respective document A in the set of documents and a target document B, based on weighted IDF values associated with one or more of the extracted semantic entities, wherein calculating the similarity level involves calculating:

$$sim(A, B) = \frac{2 * \sum_{e \in A \cap B} (idf_e * w_e)}{\sum_{e \in A} (idf_e * w_e) + \sum_{e \in B} (idf_e * w_e)},$$

wherein $idf_e$ indicates an IDF value for an entity e, and wherein $w_e$ indicates a weight for entity e; and
a result-generation mechanism configured to generate a result indicating documents that are similar to the target document based on the calculated similarity level.

20. The method of claim 1, wherein calculating the similarity level between document A and document B involves calculating:

$$sim(A, B) = \frac{\sum_{e \in A \cap B} (idf_e * w_e)}{\sum_{e \in A \cup B} (idf_e * w_e)}.$$

21. The method of claim 1, wherein calculating the similarity level between document A and document B involves calculating:

$$sim(A, B) = \frac{\sum_{e \in A \cap B} (idf_e * w_e)^2}{\sqrt{\sum_{e \in A} (idf_e * w_e)^2 * \sum_{e \in B} (idf_e * w_e)^2}}.$$

22. The computer-readable storage medium of claim 10, wherein calculating the similarity level between document A and document B involves calculating:

$$sim(A, B) = \frac{\sum_{e \in A \cap B} (idf_e * w_e)}{\sum_{e \in A \cup B} (idf_e * w_e)}.$$

23. The computer-readable storage medium of claim 10, wherein calculating the similarity level between document A and document B involves calculating:

$$sim(A, B) = \frac{\sum_{e \in A \cap B} (idf_e * w_e)^2}{\sqrt{\sum_{e \in A} (idf_e * w_e)^2 * \sum_{e \in B} (idf_e * w_e)^2}}.$$

* * * * *